(12) United States Patent
Baker et al.

(10) Patent No.: US 9,477,065 B1
(45) Date of Patent: Oct. 25, 2016

(54) HELIOSTAT ARRAY

(71) Applicants: James Baker, Pasadena, CA (US); Nikolai Syssoev, Canoga Park, CA (US); Aaron Fyke, Alhambra, CA (US)

(72) Inventors: James Baker, Pasadena, CA (US); Nikolai Syssoev, Canoga Park, CA (US); Aaron Fyke, Alhambra, CA (US)

(73) Assignee: EDISUN MICROGRIDS, INC., Pasadena, CA (US)

( * ) Notice: Subject to any disclaimer, the term of this patent is extended or adjusted under 35 U.S.C. 154(b) by 0 days.

(21) Appl. No.: 14/959,969

(22) Filed: Dec. 4, 2015

Related U.S. Application Data

(60) Provisional application No. 62/088,481, filed on Dec. 5, 2014.

(51) Int. Cl.
| | |
|---|---|
| *G02B 5/08* | (2006.01) |
| *G02B 7/183* | (2006.01) |
| *G02B 7/198* | (2006.01) |
| *F24J 2/16* | (2006.01) |
| *H02S 40/22* | (2014.01) |

(52) U.S. Cl.
CPC ............. *G02B 7/183* (2013.01); *G02B 5/0808* (2013.01); *G02B 7/198* (2013.01); *H02S 40/22* (2014.12); *Y02E 10/47* (2013.01)

(58) Field of Classification Search
CPC .... G02B 5/0808; G02B 7/183; G02B 7/198; Y02E 10/47
USPC .............. 359/850, 851; 353/3; 126/687, 696
See application file for complete search history.

(56) References Cited

U.S. PATENT DOCUMENTS

| | | | | |
|---|---|---|---|---|
| 3,466,119 | A * | 9/1969 | Francia | F24J 2/10 126/602 |
| 4,110,009 | A * | 8/1978 | Bunch | F24J 2/16 126/600 |
| 4,245,895 | A * | 1/1981 | Wildenrotter | F24J 2/10 126/696 |
| 4,999,059 | A * | 3/1991 | Bagno | F24J 2/07 126/688 |
| 6,042,240 | A * | 3/2000 | Strieber | B64G 1/10 126/685 |
| 6,984,050 | B2 * | 1/2006 | Nakamura | F24J 2/07 353/3 |
| 9,217,842 | B2 * | 12/2015 | Nakamura | G02B 7/183 |
| 2005/0034752 | A1* | 2/2005 | Gross | F24J 2/38 136/246 |
| 2005/0217665 | A1* | 10/2005 | Luconi | F24J 2/16 126/696 |
| 2005/0229924 | A1* | 10/2005 | Luconi | F24J 2/16 126/696 |
| 2009/0277224 | A1* | 11/2009 | Angel | F24J 2/38 65/60.1 |
| 2014/0150774 | A1* | 6/2014 | Chang | F24J 2/38 126/600 |

* cited by examiner

*Primary Examiner* — Ricky D Shafer
(74) *Attorney, Agent, or Firm* — Andrew S. Naglestad

(57) ABSTRACT

A heliostat array comprising a modular grid is disclosed. The array comprises a plurality of grid members; a plurality of stanchions connected to six of the plurality of the grid members; a plurality of heliostats mounted on stanchions and grid members. Each stanchion may consist of a threaded rod and locking mechanism for rigidly affixing the six grid members to the threaded rod. Each of the plurality of heliostats comprises a mirror, a circular track, and a carousel for rotating the mirror about the circular track. The circular track is concentric with a stanchion and mounted to three grid members that are 120 degrees apart. Each of the carousels may be operably coupled to and biased toward the corresponding circular track.

10 Claims, 7 Drawing Sheets

HELIOSTAT ARRAY

CROSS-REFERENCE TO RELATED APPLICATION(S)

This application claims the benefit of U.S. Provisional Patent Application Ser. No. 62/088,481 filed Dec. 5, 2014, titled "HELIOSTAT ARRAY," which is hereby incorporated by reference herein for all purposes.

TECHNICAL FIELD

The invention relates to a solar power plant that employs mirrors to concentrate light on a power tower. In particular, the invention features a plurality of modular heliostats that interconnect to form a rigid, wind-resistant array of mirrors for focusing light on the power tower.

BACKGROUND

There are a countless number of heliostat array designs going back many decades. Although these designs can track the sun with varying degrees of precision, they are relatively costly to manufacture and deliver compared to the price of the electricity they generate. For example, these heliostat designs often require a significant amount of steel, precision parts, skilled labor to assemble, and specialized installation equipment. In some cases, the heliostats are also manufactured offsite and shipped to the plant site at significant expense. There is therefore a need for a heliostat array design that requires relatively inexpensive material, few costly components, and little labor to assemble, and is installed on site.

SUMMARY

The invention in the preferred embodiment is a heliostat array comprising a modular grid comprising a plurality of grid members; a plurality of stanchions, each stanchion directly connected to six of the plurality of the grid members; a plurality of heliostats, each heliostat mounted on one of the plurality of stanchions as well as three of the plurality of grid members. Each stanchion may consist of a threaded rod and locking mechanism for rigidly affixing the six grid members to the threaded rod. Each of the plurality of heliostats comprises a mirror, a circular track, and a carousel for rotating the mirror about the circular track. The circular track is concentric with a stanchion and mounted to three grid members that are 120 degrees apart. Each of the carousels may be operably coupled to and biased toward the corresponding circular track.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

Figure 1:
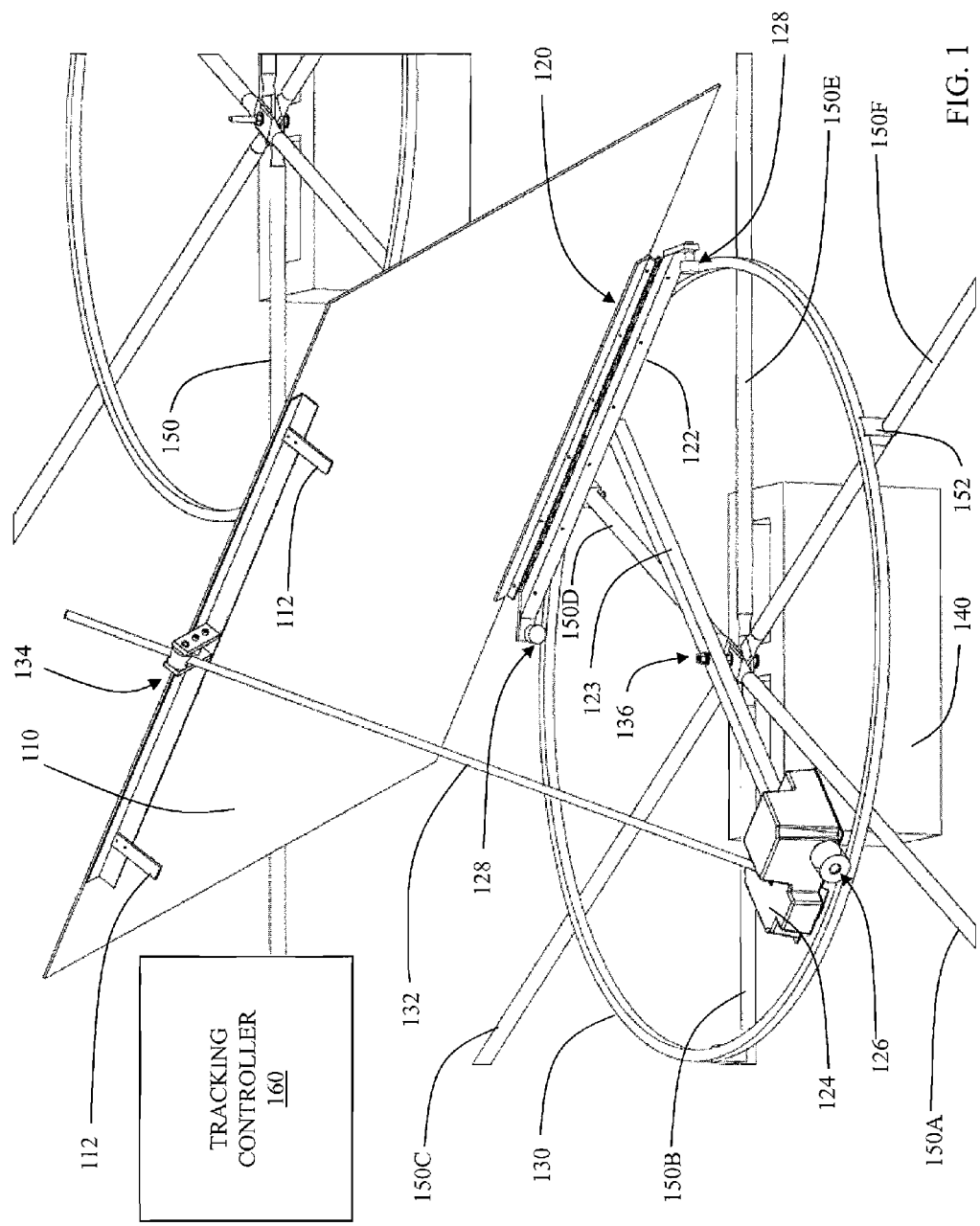
FIG. 1 is a close up of one heliostat in an array of heliostats, in accordance with the preferred embodiment of the present invention.

The present invention pertains to a heliostat array that is inexpensive, accurate, robust, resistant to wind, and quick to install. The heliostat array includes numerous identical heliostats that are linked together to form a grid that securely holds the heliostats in place, and at least one tracking controller configured to determine the orientation of the heliostats through the day. Illustrated in FIG. 1 is the backside of a heliostat in accordance with a preferred embodiment. The heliostat includes a mirror 110 operably coupled to a carousel and a circular track 130. The carousel includes a first horizontal brace 122 and a second horizontal brace 123. The first horizontal brace 122 is connected to a pair of front wheels 128 and to the mirror 110 by means of hinge 120. The second horizontal brace 123 is rigidly connected to the first brace 122 and to a drive motor/gearbox 124 with one or more back wheels 126. The front wheels 128 and back wheel 126 ride on top of and engage the circular track 130.

The carousel is pivotably connected to a stanchion 136 at the center of the circular track 130. The carousel then rotates relative to the circular track when the drive motor/gearbox 124 is activated. The motor/gearbox turns the wheel 126 to drive the carousel 130 for purposes of changing the azimuth angle of the mirror 110. The desired azimuth angle of the mirror is determined by the tracking controller 160. In some embodiments, the heliostat employs a circular gear rack and pinion in place of the circular track and wheels.

The drive motor/gearbox also includes a second motor (not shown) that turns a jack screw 132 mounted to the mirror by means of a threaded bracket 134. The top of the mirror pivots either up or down about hinge 120 depending on the direction the jack screw is turned. The elevation angle of the mirror is determined by the tracking controller 160 which orients one or more mirrors to reflect sunlight to a solar receiver (not shown) throughout the day.

The stanchion 136 is mounted to a footing 140, preferably a concrete block that rests on the ground. The stanchion is also coupled to a modular grid structure that rigidly connects each heliostat to a plurality of neighbor heliostats. The grid structure, collectively referred to as grid, generally includes a large number of tubes, rods, or beams refer to herein as grid members 150. The grid members are coupled together to form repeating triangles and vertices. For heliostats located at the interior of the grid, most vertices include six grid members connected to the heliostat stanchion 136. As shown in FIG. 1, the six grid members 150A-150F for one stanchion are radially distributed at 60 degree intervals around the stanchion.

The heliostat in the preferred embodiment is configured to retreat to a low-profile stow configurations when the wind or other weather condition risk damage the heliostat. When stowing, the mirror 110 rotates down to a horizontal position until the legs 112 make contact with the circular track 130. At the point where the legs and track make physical contact, the motor (not shown) driving the mirror into the stow position begins drawing higher current. Detection of current may be used as a signal confirming that the mirror is fully stowed. The jump in current drawn by the motor is especially apparent when the motor and jack screw 132 are coupled using a worm gear, for example.

Figure 2:
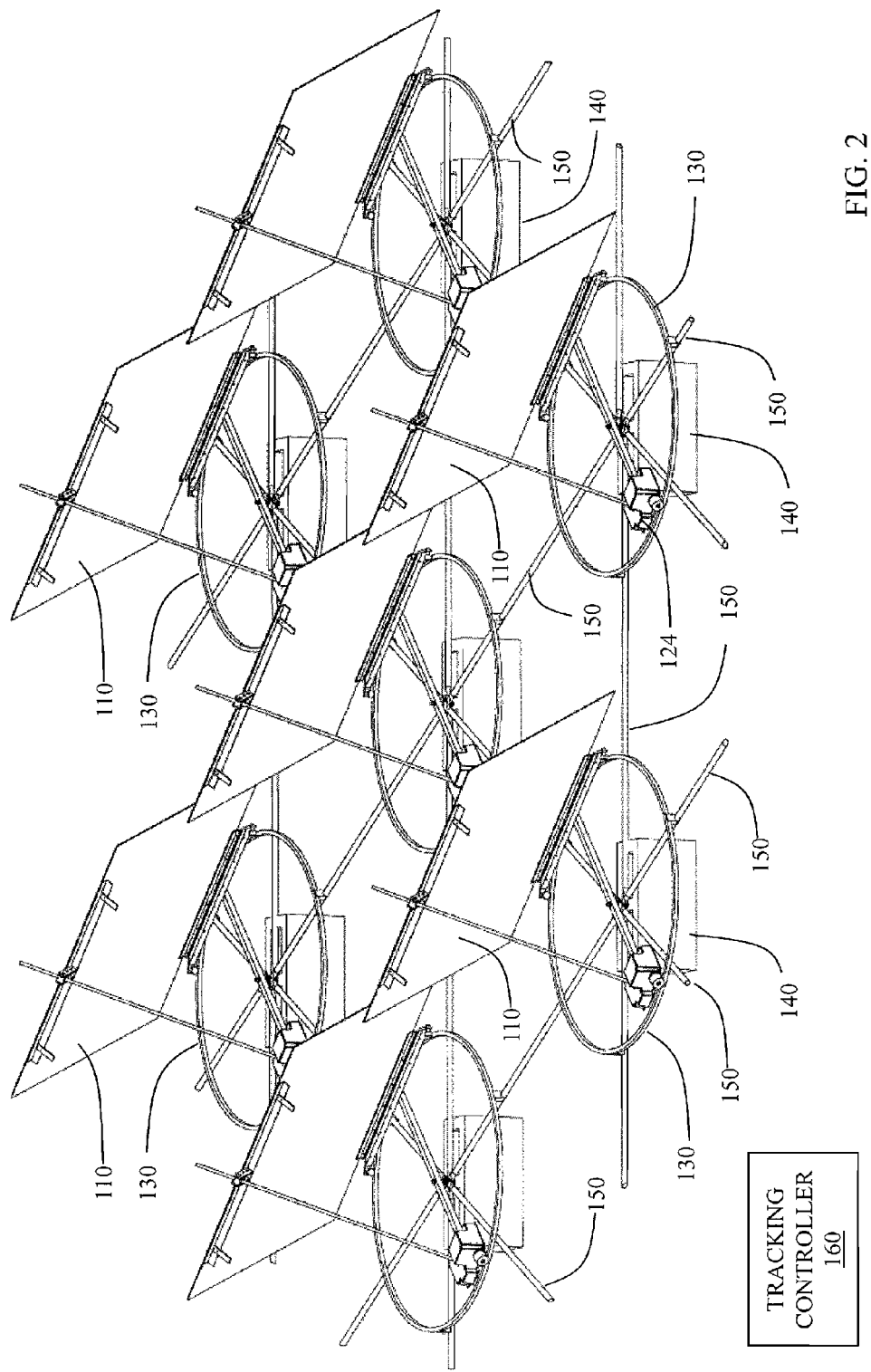
FIG. 2 is an isometric view of an array of heliostats, in accordance with the preferred embodiment of the present invention.
Figure 3:
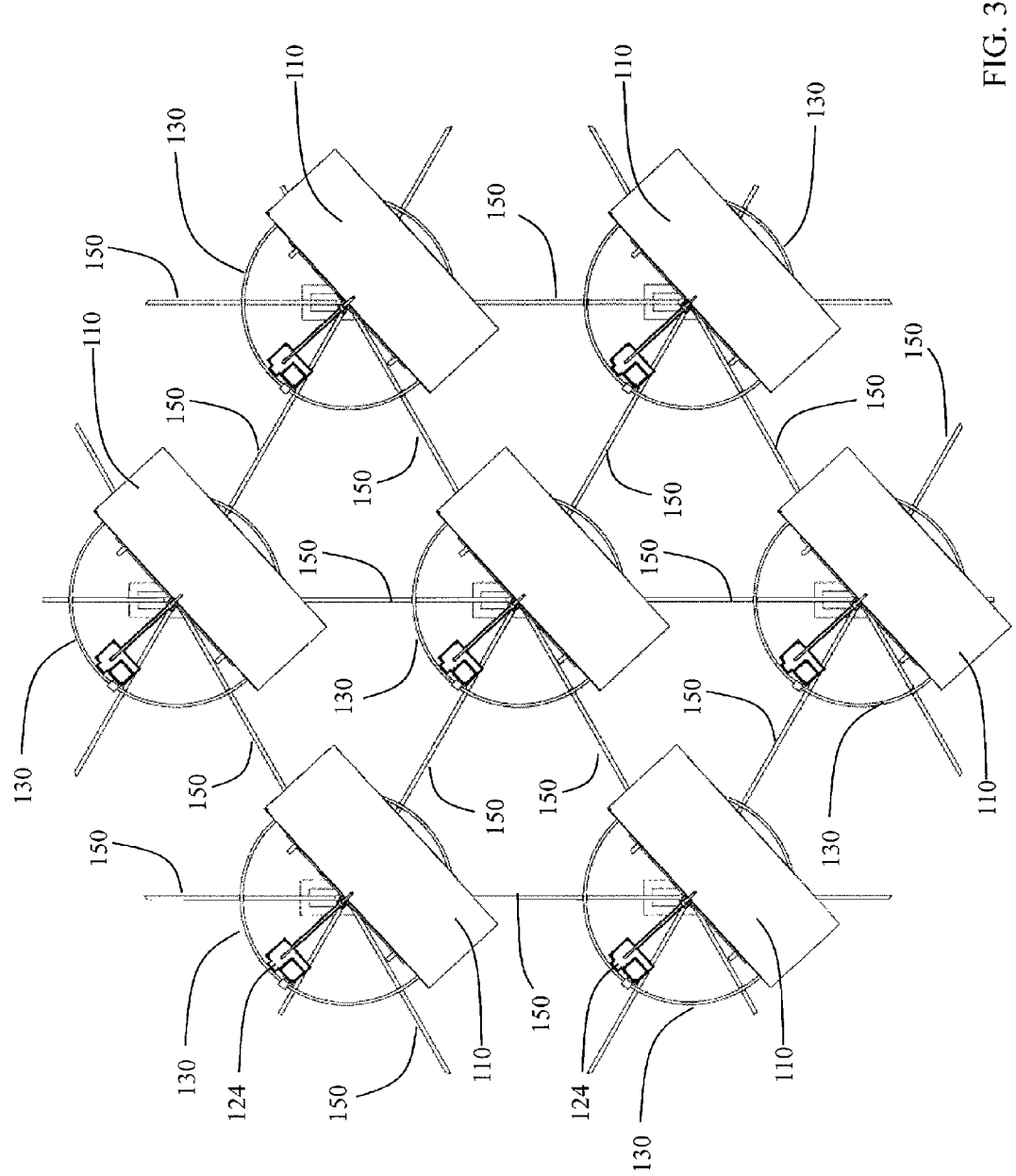
FIG. 3 is a plan view of an array of heliostats, in accordance with the preferred embodiment of the present invention.
Figure 4:
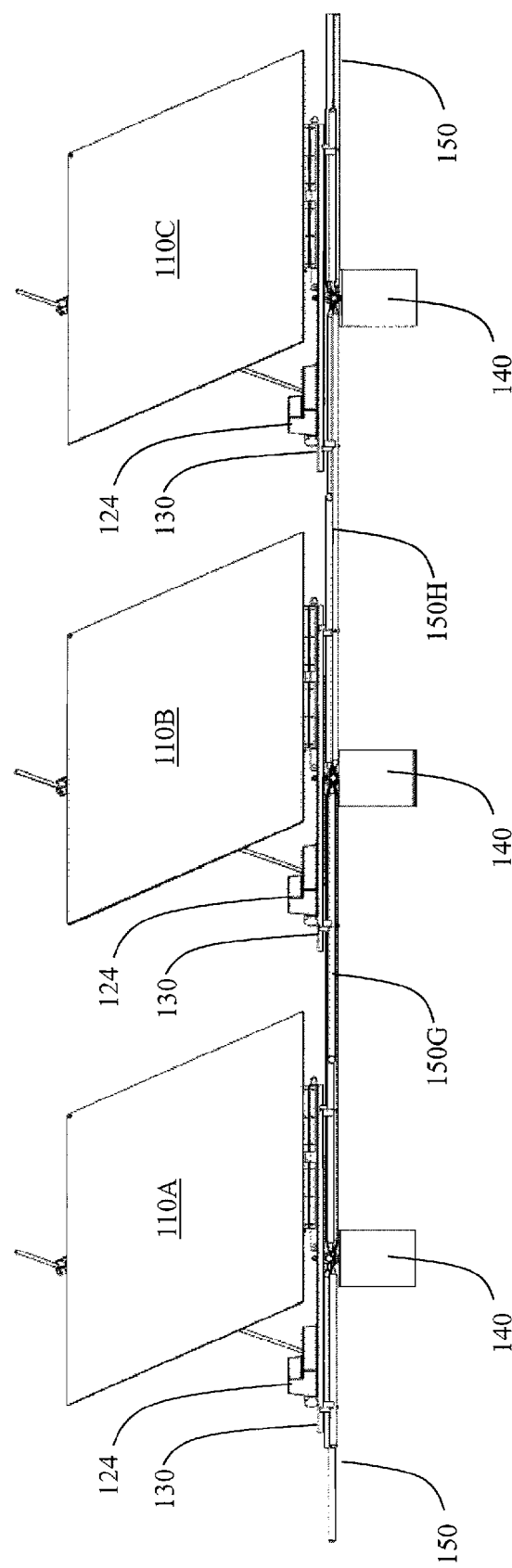
FIG. 4 is a side view of an array of heliostats, in accordance with the preferred embodiment of the present invention.

As illustrated in FIGS. 2 through 4, the grid members 150 form an extensive grid by directly connecting each heliostat with the adjacent heliostats immediately neighboring that heliostat. The grid members are rigidly connected to each stanchion by means of a locking mechanism. The grid serves at least two purposes: (a) the grid facilitates quick and easy assembly of a heliostat array, and (b) the grid holds the heliostats in position during high winds.

To assemble a heliostat array and grid, a first heliostat with footing is placed in position, a grid member attached to the first heliostat, and the second heliostat with footing attached at the other end of that grid member. Two more grid members are installed to form a triangular grid, and the third heliostat with footing installed at their vertex, i.e., the point the second two grid members meet. The placement of all the additional heliostats is easily determined using grid members to extend the edge of the grid outward and create additional vertices. As such, there is little or no measuring or surveying necessary to deploy the entire heliostat array due to the uniformity and repeatability of the modular grid. As the grid is deployed, circular tracks 130 are mounted to three grid members that are 120 degrees apart using clips 152. The remaining portion of the heliostats, including mirrors 110 and assembled carousels, are then attached to the respective circular track and stanchion.

The modular grid also serves to secure the heliostat array in high winds. Consider the three heliostats in FIG. 4, for example. If the winds are blowing from left to right, each of the three heliostats 110A-110C will experience a wind load that exerts a clockwise torque on each mirror. The torque on the first mirror 110A will be transferred to the first grid member 150G which has a downward force exerted on it. The second mirror 110B also experiences a clockwise torque which induces an upward force on the first grid member 150G. The downward force by the first mirror 110A and upward force by the second mirror 110B therefore counteract each other. Similarly, the downward force by the second mirror 110B on the second grid member 150H is counteracted by the upward force exerted by the third mirror 110C. The balancing of the wind loads between adjacent heliostats effectively eliminates the need for each individual heliostat to withstand the full force of the wind alone. As such, the heliostat array can be built with a lighter duty structure which reduces the overall cost of materials for the heliostat array.

Figure 5:
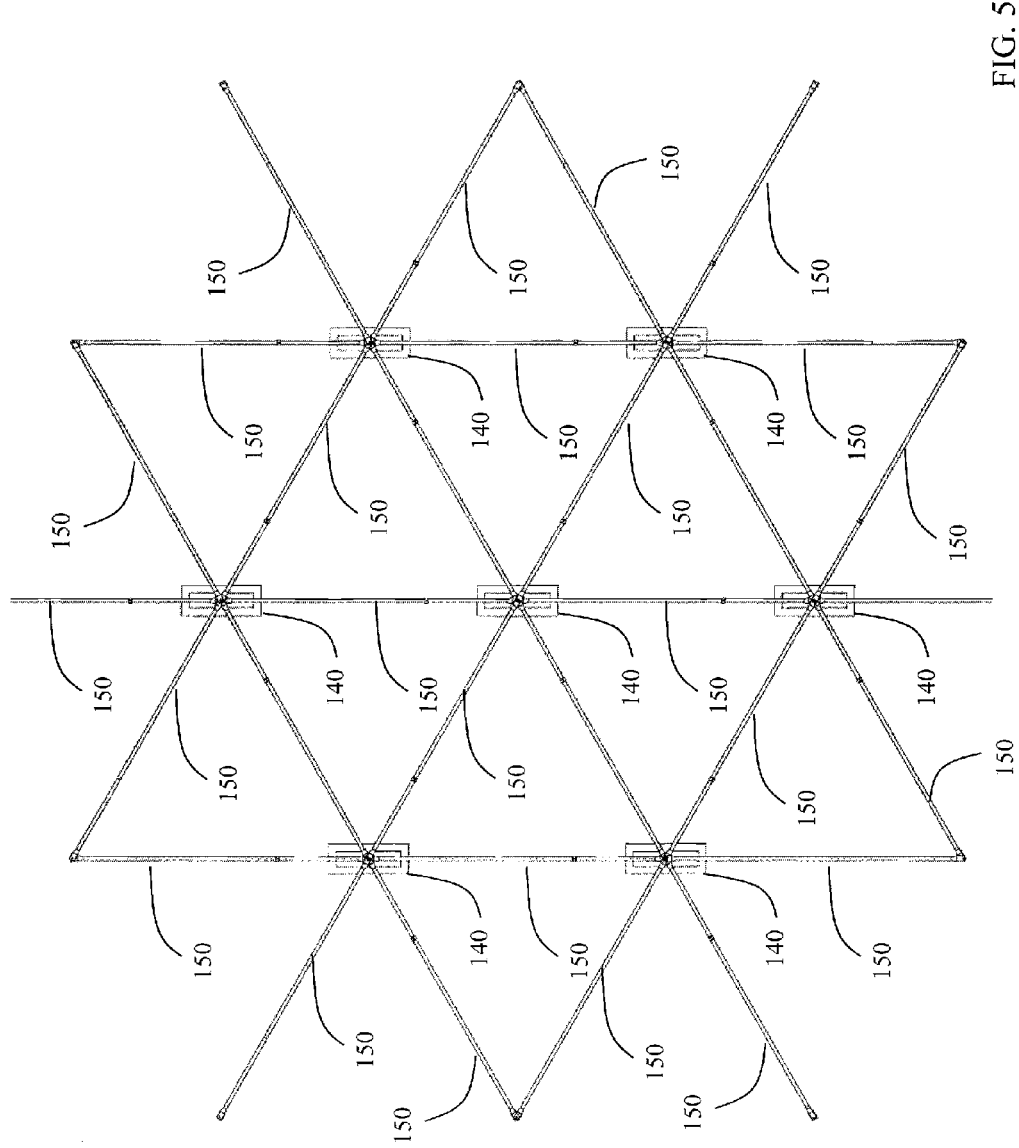
FIG. 5 is a plan view of a grid for a heliostat array, in accordance with the preferred embodiment of the present invention.

The uniformity and repeatability of the grid 150 is illustrated in FIG. 5 which shows the grid 150 and footings 140 in plan view. As can be seen, six grid members attached to the stanchion/footing 140 at the interior of the grid. In the preferred embodiment, each grid member is long enough to link two neighboring heliostats (not shown) which is the span between two adjacent footings. In other embodiments, the grid members are longer and directly link to three or more co-linear heliostats. Although only seven footings are shown in FIG. 5, additional footings (and heliostats) are contemplated at the vertices of the grid members around the periphery. One skilled in the art will appreciate that the grid can easily be extended in any direction by merely adding additional grid members, footings, and heliostats.

Figure 6:
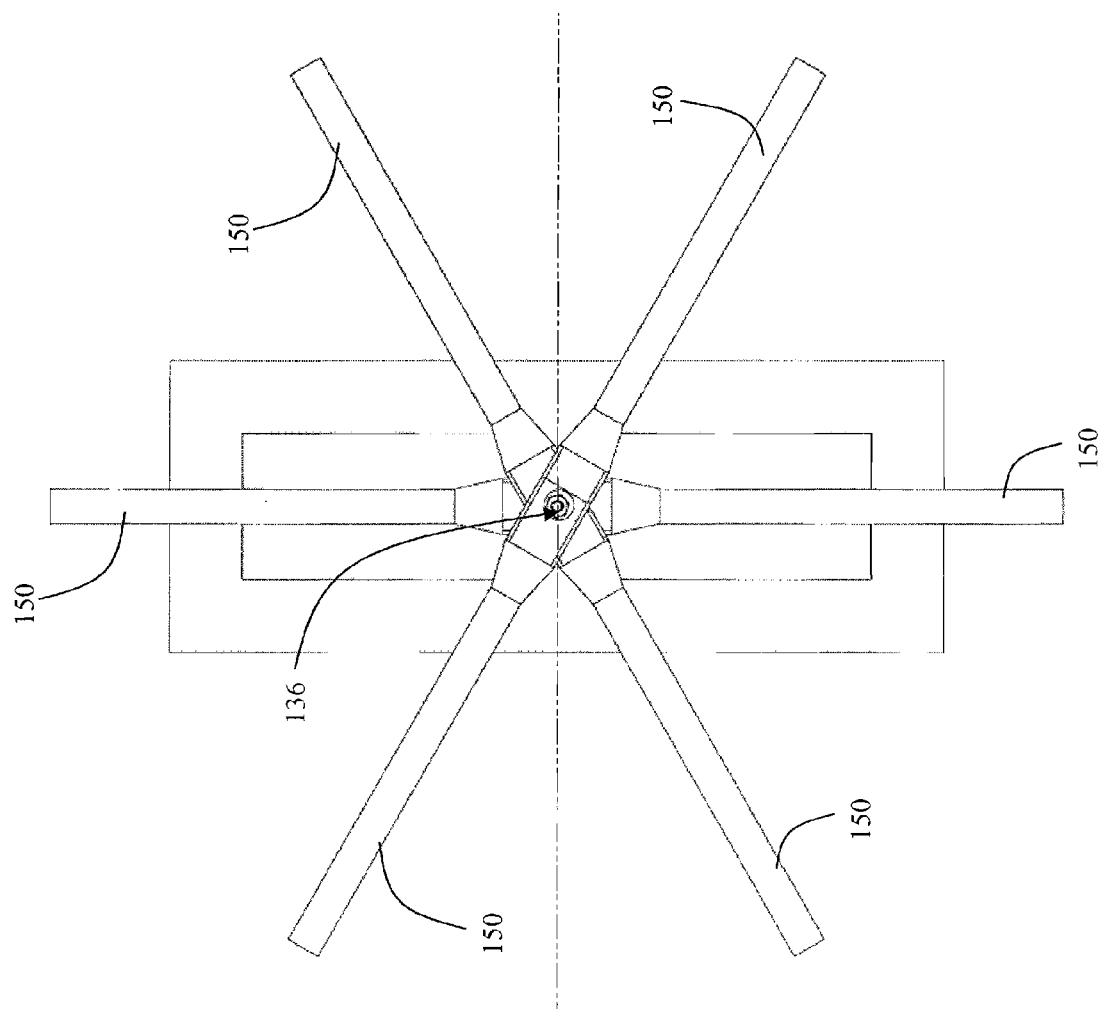
FIG. 6 is a plan view of a stanchion and footing for a heliostat array, in accordance with the preferred embodiment of the present invention.
Figure 7:
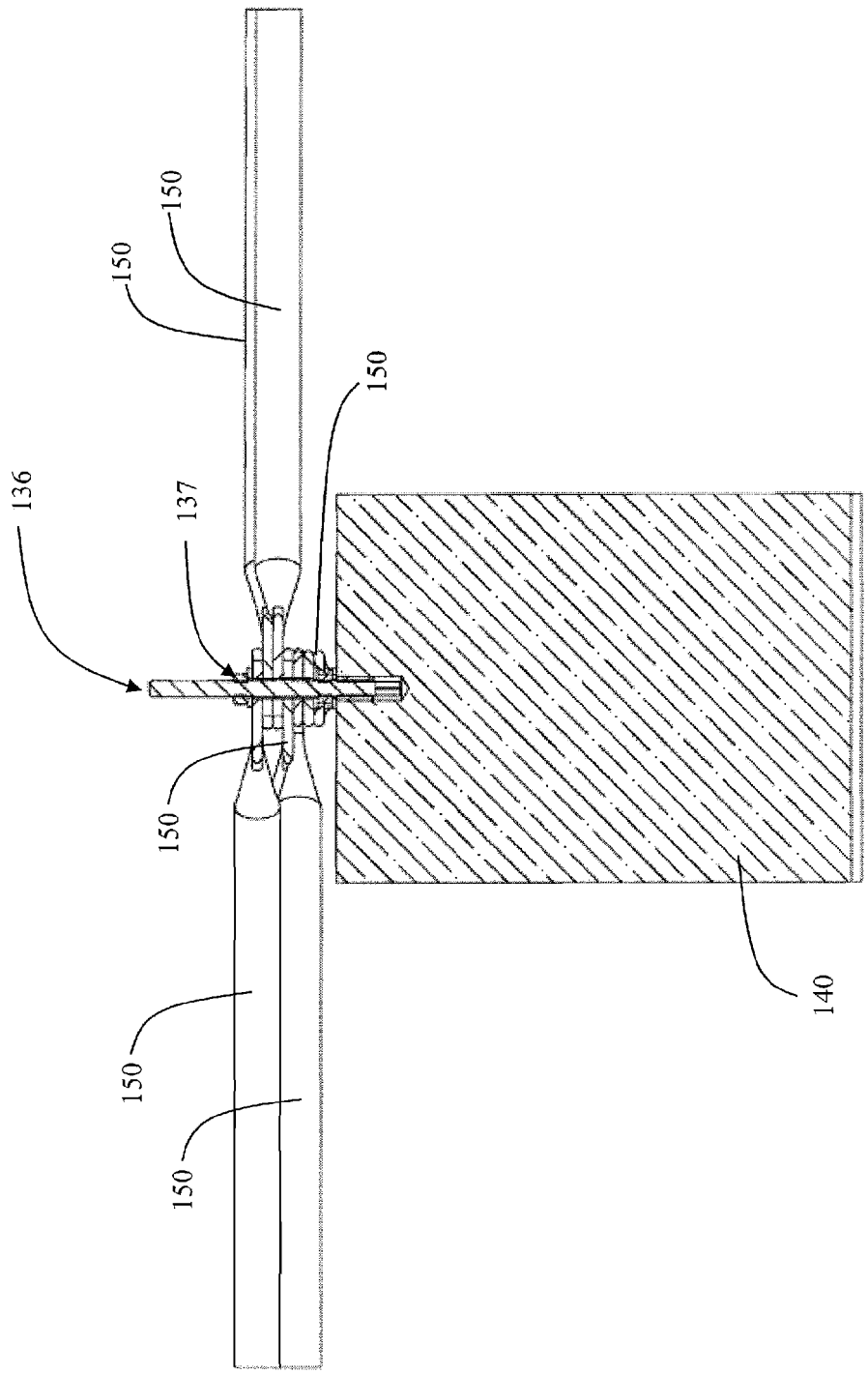
FIG. 7 is a side view of a stanchion and footing for a heliostat array, in accordance with the preferred embodiment of the present invention.

Illustrated in plan view in FIG. 6 and cross section in FIG. 7 is an individual stanchion 136 and footing 140 as they connect to grid members 150. In the preferred embodiment, the stanchion is a threaded rod that is affixed vertically to or in the footing. A grid member generally includes tubing, rod, and/or beam with an aperture at each end. The aperture is an over-sized hole configured to receive the stanchion 136. Using over-sized holes at either end of the grid member enables the grid member to fit even when the distance between stanchions varies due to rough or hilly terrain. After the six grid members 150 are attached to the stanchion, a lock nut 137, fastener, or other locking mechanism is used to secure the grid members. Thereafter, the circular track and carousel may be attached and the mirror assembly installed on the carousel.

In the preferred embodiment, the tracking controller is a tracking processor configured to calculate the orientation with which to orient one or more mirrors. The tracking processor may be a closed-loop tracking system that determines mirror orients based on the detected position of the sun and receiver. In other embodiments, the tracking processor may be an open-loop system that determines mirror orients based on the time of day and a database of solar position data. In the preferred embodiment, the tracking processor is a computing device executing machine-readable instructions.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including personal computing devices, servers, general purpose computers, special purpose computers, application-specific integrated circuit (ASIC), and digital/analog circuits with discrete components, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A heliostat array comprising:
   a modular grid comprising a plurality of grid members;
   a plurality of stanchions, each stanchion directly connected to six of the plurality of the grid members;
   a plurality of heliostats, each heliostat mounted on:
   one of the plurality of stanchions; and
   three of the plurality of grid members.

2. The heliostat array in claim 1, wherein each stanchion consists of a threaded rod and locking mechanism for rigidly affixing the six grid members to the threaded rod.

3. The heliostat array in claim 2, further comprising a plurality of footings, each footing comprising a block mounted to one of the plurality of stanchions.

4. The heliostat array in claim 1, wherein each of the plurality of heliostats comprises a mirror, a circular track, and a carousel for rotating the mirror about the circular track; wherein the circular track is concentric with a stanchion and mounted to three grid members that are 120 degrees apart.

5. The heliostat array in claim 4, wherein each of the plurality of grid members comprises two ends, each end comprising an aperture configured to receive a stanchion.

6. The heliostat array in claim 5, wherein each aperture is an over-sized aperture configured to receive a stanchion.

7. The heliostat array in claim 5, further comprising a plurality of clips, each clip configured to connect a grid member to a circular track.

8. The heliostat array in claim 4, wherein the carousel is biased toward the circular track.

9. The heliostat array in claim 8, wherein the mirror of each heliostat is mounted to a carousel with at least three wheels configured to engage the circular track; wherein the stanchion is configured to bias the carousel toward the circular track.

10. The heliostat array in claim 8, further comprising one or more legs that contact the carousel and circular track when the mirror is in a stow configuration.

* * * * *